United States Patent [19]
Covi et al.

[11] Patent Number: 5,539,606
[45] Date of Patent: Jul. 23, 1996

[54] ELECTRONIC CIRCUIT BREAKER

[75] Inventors: Kevin R. Covi, Glenford; William J. Petrowsky, Kingston; Steven G. Shevach, Hurley, all of N.Y.

[73] Assignee: International Business Machines Corporation, Armonk, N.Y.

[21] Appl. No.: 201,872

[22] Filed: Feb. 25, 1994

[51] Int. Cl.$^6$ ........................................................ H02H 3/00
[52] U.S. Cl. ............................................. 361/94; 361/79
[58] Field of Search ............................. 361/56, 58, 60, 361/86, 57, 78, 79, 87, 93, 94, 98, 100, 101, 111

[56] References Cited

U.S. PATENT DOCUMENTS 3,534,249  10/1970  Neill et al. ........................... 361/58
4,551,779  11/1985  Murikami et al. ...................... 361/86

Primary Examiner—Jeffrey A. Gaffin
Assistant Examiner—Ronald W. Leja
Attorney, Agent, or Firm—Lawrence D. Cutter

[57] ABSTRACT

An electronic circuit breaker includes multiloop control loops based upon a current sensing loop and a voltage sensing loop. The current sensing loop also operates to drive a timer which ultimately controls whether current flows through the load or not. Additionally, the current loop is made to be dominant over the voltage loop. However, during normal operation the voltage loop and current loop act cooperatively to effectively control the impedance as seen by the load.

1 Claim, 3 Drawing Sheets

ELECTRONIC CIRCUIT BREAKER

BACKGROUND OF THE INVENTION

The present invention is generally directed to electronic circuit breakers and similar devices for use in direct current systems. More particularly, the present invention is directed to a circuit breaker which provides a substantially constant impedance, as seen from the load, under varying load conditions. Additionally, the present circuit breaker is actuated by a combination of circuit conditions including not only current level but also current overload duration.

In large mainframe computer systems, there are typically provided a number of direct current power supply units. During routine maintenance situations, it often becomes necessary to turn off one or more banks of these power supply units. When mechanical circuit breakers are employed for this purpose, it is easily possible to turn off an incorrect circuit. Such activities often only compound problems which may exist. Additionally, for certain mechanical breakers, it is difficult to discern whether they are on, off, or have been tripped. Electronic circuit breakers do not necessarily exhibit these problems.

However, when a mechanical circuit breaker is replaced by an electronic circuit breaker, one must also be concerned with circuit behavior during varying load conditions which do not in fact result in overcurrent conditions and in particular do not result in overcurrent conditions which cause the circuit breaker to be "tripped". In particular, under conditions of varying load, when an electronic circuit breaker is employed, it is desirable to be able to provide a circuit which exhibits constant impedance properties as seen by the load, even under varying load conditions.

The use of an electronic circuit breaker would also provide important signal and control advantages. In particular, it would be desirable to have an electronic circuit breaker which could be addressed by name or by other designations from a computer keyboard or from another console device. Likewise it would be desirable to have information concerning the "on" or "off" status of the device being protected and/or indications to whether or not the circuit breaker has experienced a sufficiently large prior overcurrent condition to have caused an earlier fault interruption.

SUMMARY OF THE INVENTION

In accordance with a preferred embodiment of the present invention, an electronic circuit breaker comprises a current control means for connecting a load in series with a source of electrical current. There are also provided means to sense electrical current through the control means and also to sense voltage across the current control means. Additionally, there is provided an actuating means which causes the control means to interrupt the current to the load upon condition of excess current which is determined not only by the level of current but also by the duration of current overload as determined by a timing mechanism. Also, since what is provided is an electronic circuit breaker which is in series with a load which may experience power fluctuations, a mechanism is also provided to regulate the voltage across the control means as a function of the current through the control means so as to provide a substantially constant impedance, as seen by the load.

A preferred embodiment of the present invention is implemented in terms of a power MOSFET and a multi-loop control circuit. In particular, there is provided a voltage loop and a current loop. These multi-loop control circuit sensing means operate interactively with each other and cooperatively with a timing means to provide not only an appropriate mechanism for circuit interruption but also a-mechanism for simultaneously providing a constant impedance to the load.

Accordingly, it is an object of the present invention to provide an electronic circuit breaker.

More particularly, it is an object of the present invention to provide an electronic circuit breaker which may be controlled by logic level signals.

It is also an object of the present invention to provide circuit interruption means which depend not only on current level but also on current overload duration.

It is yet another object of the present invention to provide a circuit breaker which is electrically isolated with respect to its input and output logic signals.

It is a still further object of the present invention to provide a circuit breaker which exhibits a substantially constant impedance to the load.

It is also an object of the present invention to provide ease of maintenance and safety during servicing operations.

It is an additional object of the present invention to reduce the error prone aspects of interfacing with large panels of mechanical circuit breakers.

It is yet another object of the present invention to eliminate a human intervention at breaker panels, particularly when servicing a machine such as a large mainframe computer.

Lastly, but not limited hereto, it is an object of the present invention to reduce the inadvertent elimination of power across various boundaries in a large mainframe computer system and most particularly in those situations in which various units of these computer systems are operating independently of one another and which can maintain their running status when other portions of the system are either accidentally or deliberately shutdown for maintenance or other repairs.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may be best understood by reference to the following description taken in connection with the accompanying drawings in which:

DETAILED DESCRIPTION OF THE INVENTION

Figure 1:
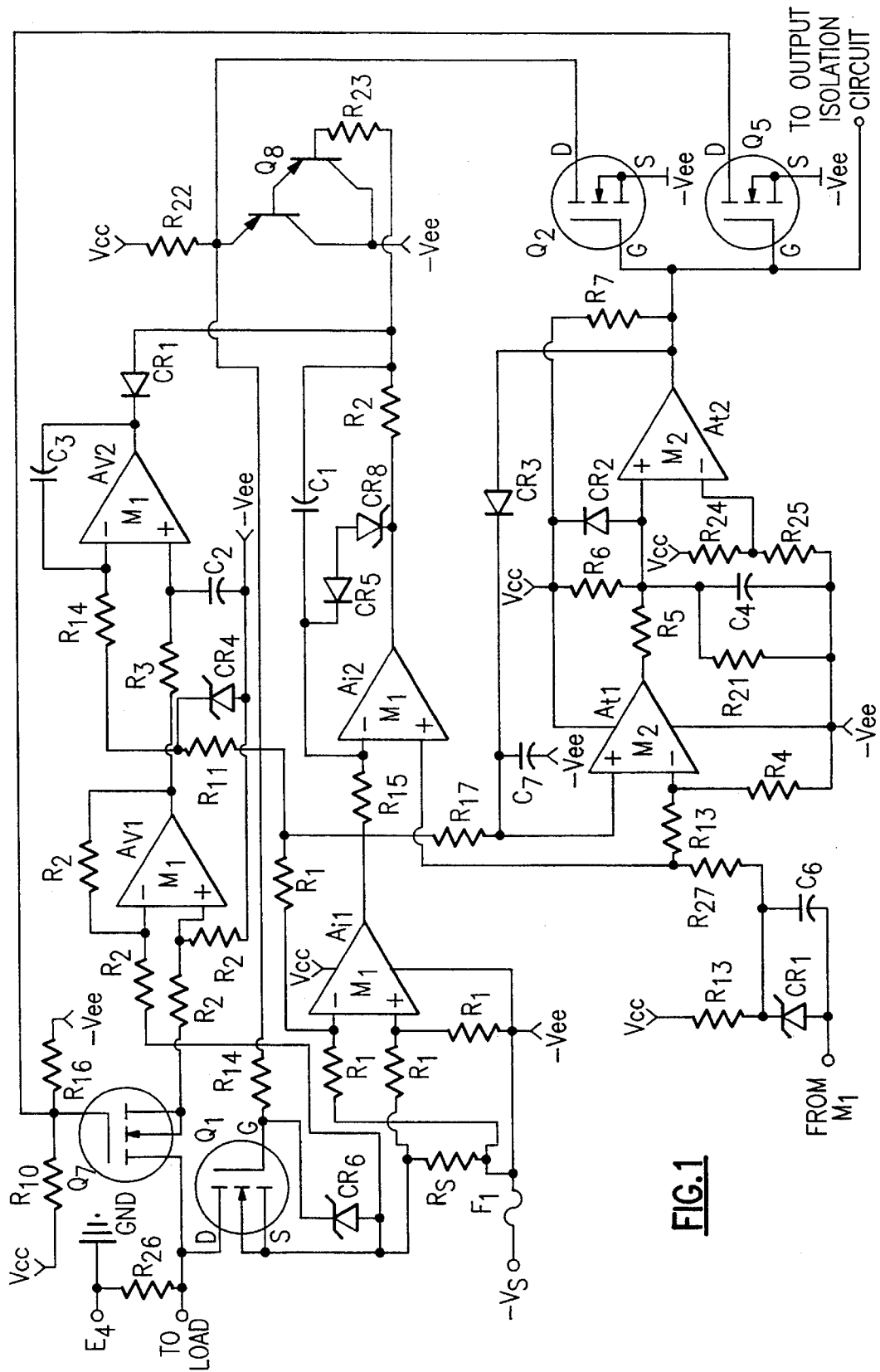
FIG. 1 is an electrical schematic diagram illustrating a preferred embodiment of the present invention.
Figure 4:
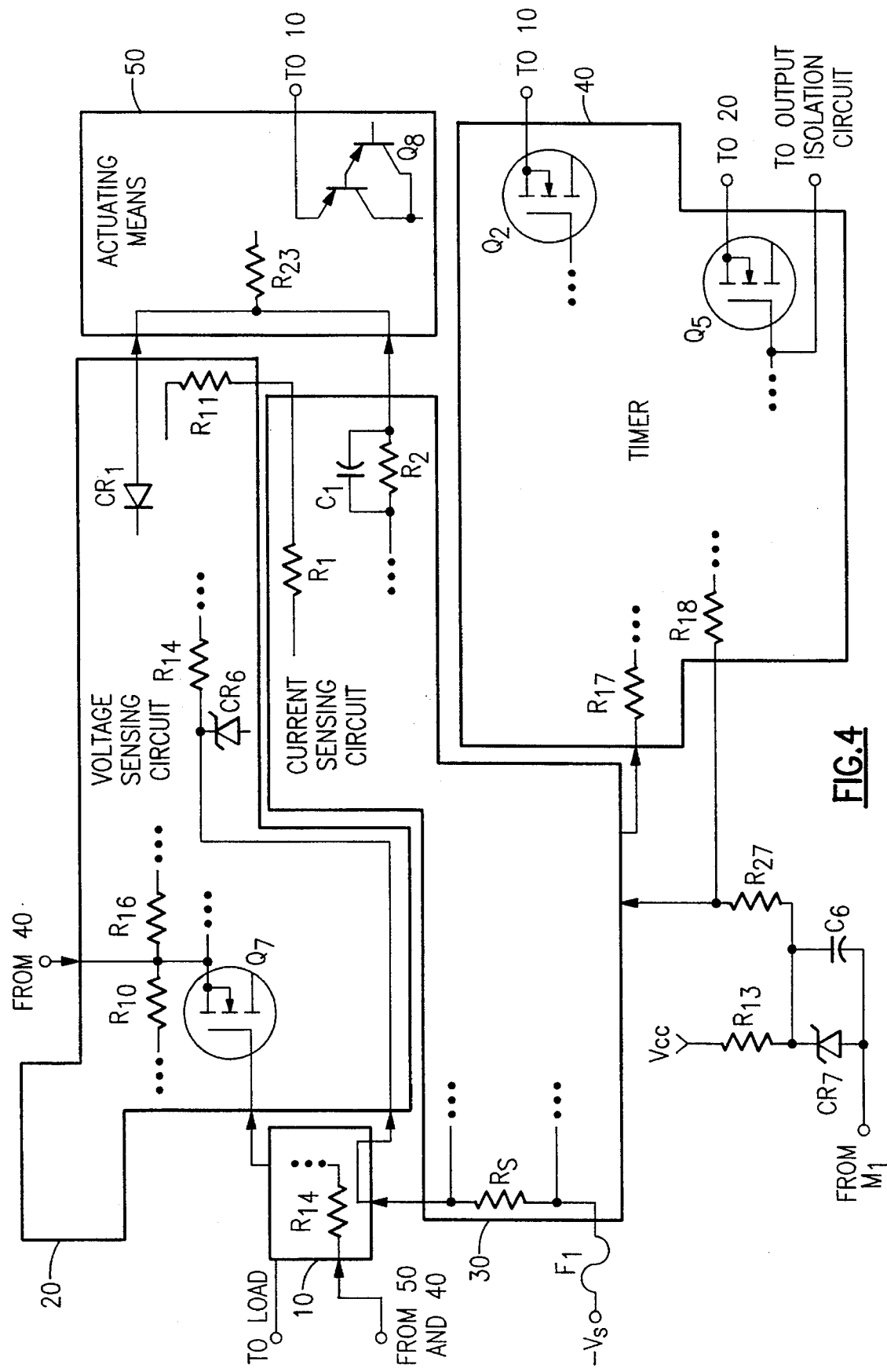
FIG. 4 is a partially schematic and partially block diagram view illustrating the major subsystems of the circuit shown in FIG. 2 and their relationships to one another.

The present invention may best be understood by reference to both FIGS. 1 and 4. FIG. 1 illustrates the total circuit employed in the present invention, while FIG. 4 provides a partially schematic and partially block view of the major components of the present and overall system. FIG. 4 provides a view of the various major components in the circuit interrupter of the present invention. In particular, it is noted that the present invention includes control means 10 (see FIG. 4). Control means 10 includes an N-channel power MOSFET $Q_1$ which is connected in series with the load which is to be protected by the present invention. $Q_1$ may also consist of one or more power control devices in parallel. The load current flows through $Q_1$ through $R_s$ and fuse $F_1$. The voltage drop across $R_s$ is used to provide a voltage input to differential amplifier $A_{i1}$ (FIG. 1). It is seen that it is the voltage across $R_s$ which provides a voltage signal which is proportional to the load current. It is this voltage which drives the operation of current sensing circuit 30 (see FIG. 4). Power MOFSET $Q_1$ is the mechanism used to control the current to the load. It is also the mechanism employed not only to interrupt this current but also to provide a constant impedance view as seen by the load under normally varying load conditions. In addition to current control means 10 and current level sensing means 30, FIGS. 1 and 4 also illustrate the presence of voltage level sensing means 20 whose input is derived directly from the voltage across $Q_1$. It is noted in this regard that FET device $Q_7$ normally operates in the on or conducting state, so that the voltage present at the drain of $Q_1$ is available as an input to voltage sensing circuit 20.

Additionally reflected in FIG. 4 is the presence of timer means or timing mechanism 40. This timing mechanism operates by controlling the charging of capacitor $C_4$ through resistor $R_6$. This charging occurs as a function of the current level through $Q_1$ in comparison with a reference voltage value. When the current level exceeds a predetermined value for a predetermined period of time, timer circuit 40 turns on transistor $Q_2$ which is connected through resistor $R_{14}$ to the gate of power MOFSET $Q_1$. This provides a time dependent overcurrent control which operates to turn off $Q_1$ during overcurrent load conditions.

However, in addition to providing to the timer a voltage which is proportional to the load current, current sensing means 30 also operates in conjunction with voltage sensing means 20 and actuating means 50 to provide control of transistor $Q_1$ during normal circuit operation. For the purpose of clarity, it is noted herein that "normal circuit operation" refers to those times when load current is flowing through transistor $Q_1$, or correspondingly, to those times when the current interruption aspect of the present invention is not being utilized.

In general, the flow of current through power MOFSET $Q_1$ to the load is determined by a multiloop control circuit. During normal operation the load current is less than the breaker rating and the voltage control loop controls $Q_1$. The voltage loop consists of operational amplifiers $A_{v1}$ and $A_{v2}$ together with their associated circuitry. The drain-to-source potential of $Q_1$ is measured and amplified by operational amplifier $A_{v1}$ and supplied to error amplifier, $A_{v2}$ where it is compared to a variable reference voltage that is proportional to the load current. This variable reference voltage is proportional to the voltage across resistor $R_s$. The output of error amplifier $A_{v2}$ drives the gate of MOSFET $Q_1$ through transistor $Q_8$ which is a Darlington circuit which buffers the high input capacitance of $Q_1$ from the error amplifier output. The voltage loop thus provides power MOFSET $Q_1$ with sufficient gate drive to operate in the saturation region with low voltage drop (high efficiency) while eliminating excess gate charge which would cause high peak currents in the event of a load short.

Also relevant in the voltage control loop is the operation of transistor $Q_7$. Transistor $Q_5$ turns off transistor $Q_7$ if timer circuit 40 times out. Timer circuit 40 also turns off transistor $Q_1$ causing its drain voltage to rise until the entire supply voltage $V_{cc}$ is across its drain and source nodes. When this happens, transistor $Q_7$ should be off to avoid damaging amplifier $A_{v1}$ with large input voltages. The connection to transistor $Q_5$ insures that transistor $Q_7$ is turned off at the appropriate time to avoid this situation.

The second major control loop also includes a differential amplifier, namely amplifier $A_{i1}$ and its associated error amplifier $A_{i2}$. This second loop, the current control loop, provides load current interruption during fault conditions. The voltage across $R_s$ which is proportional to load current, is amplified by differential amplifier $A_{i1}$. This amplified current signal is then used to provide an input for error amplifier $A_{i2}$ as well as to provide a reference input for the voltage loop. Error amplifier $A_{i2}$ compares the current signal to a fixed reference and controls MOSFET $Q_1$ through buffer transistor circuit $Q_8$. The voltage loop and the current loop both come together at the input of this buffer transistor $Q_8$. The actual amplitude of the drive to the gate of $Q_1$ cannot be higher than the current loop output, however, because diode $CR_1$ does not allow the voltage loop to source current. Thus to maintain current limit control under fault conditions, the current loop is made to be dominant over the voltage loop. When the circuit breaker encounters limiting current conditions, a timer circuit including dual comparators $A_{t1}$ and $A_{t2}$ is activated. After a predetermined amount of time under limit current conditions, the breaker trips, and transistor $Q_1$ is turned off. The allowable length of delay before tripping occurs is determined at design time by the power handling capacity of transistor $Q_1$.

The reference voltage provided to amplifier $A_{t1}$ in the timer subsystem is a voltage which is divided by resistors $R_4$ and $R_{18}$. This voltage is provided to timer mechanism 40 and is divided to make sure that noise variations do not continually trigger the unit. When capacitor $C_4$ is charged, operational amplifier $A_{t2}$ turns on, and through transistor $Q_2$, causes the main power transistor $Q_1$ to turn off. Resistor $R_{21}$ in timer 40 provides a mechanism to limit the voltage since it is undesirable to have supply voltage $V_{cc}$ provided to the input of comparator $A_{t2}$.

In current sensing means 30 capacitor $C_1$, diodes $CR_5$ and $CR_6$, and operational amplifier $A_{t2}$ function to regulate the current to a fixed level during fault conditions. This operational amplifier is therefore an error amplifier and operates when current is flowing normally.

Figure 2:
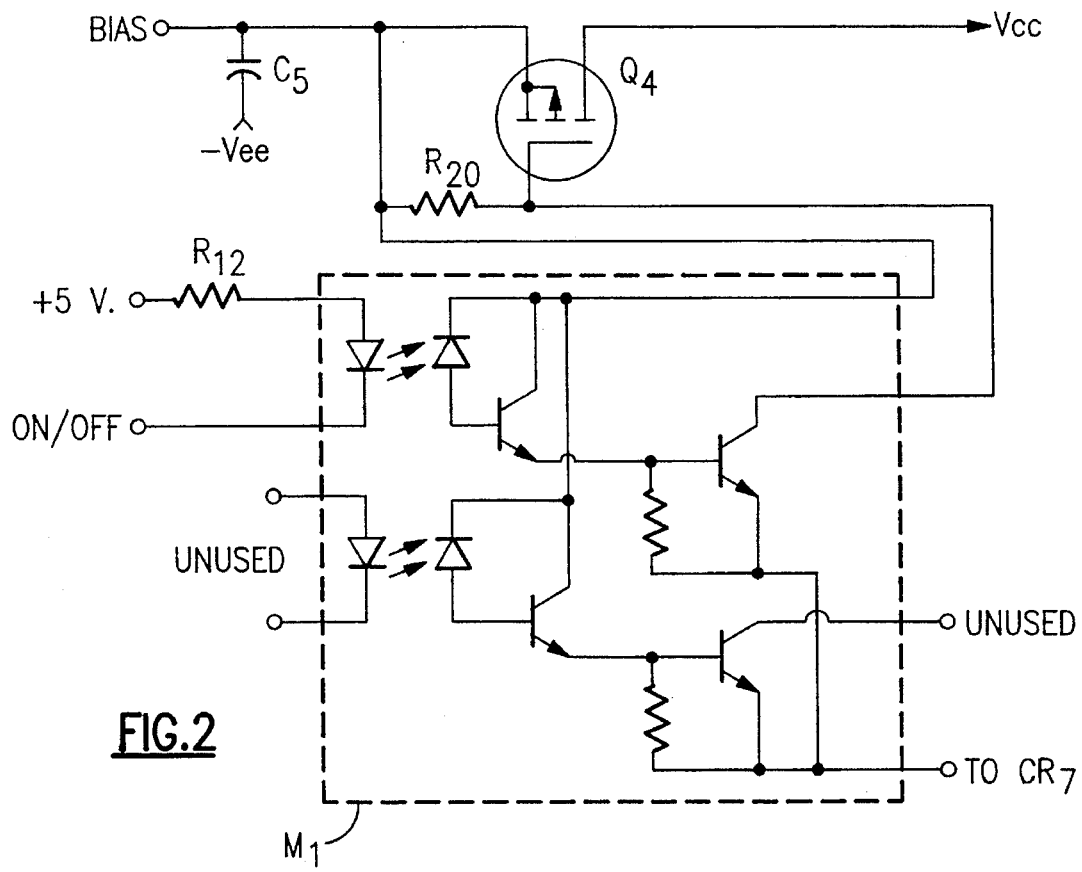
FIG. 2 is an electrical circuit diagram illustrating an input isolation circuit useable in conjunction with the circuit shown in FIG. 1.
Figure 3:
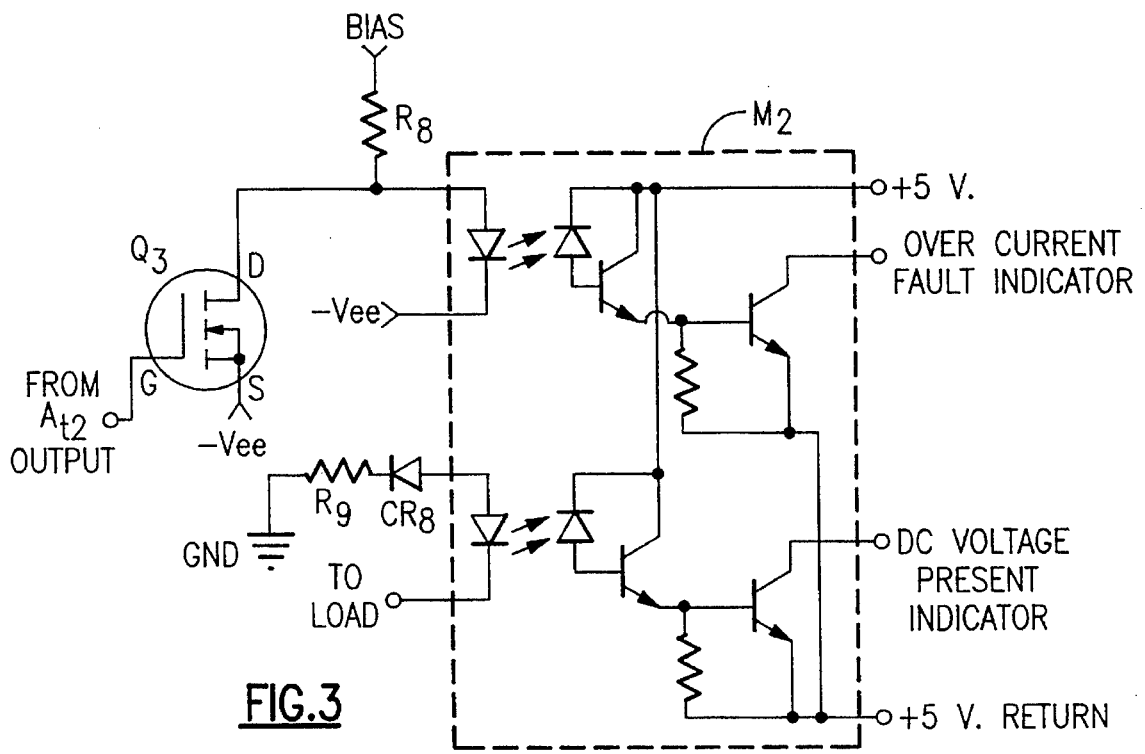
FIG. 3 is an electrical circuit diagram illustrating an output isolation circuit which is particularly useable in conjunction with the circuit shown in FIG. 1.

In order to provide electrical isolation and also to provide signal level control and status indications for the present interrupter, input and output isolation circuits are provided as shown in FIGS. 2 and 3. In particular, both of these circuits employ opto-electrical isolation modules M1 and M2 (model number HCLP 2731 as supplied by Hewlett Packard). These devices typically employ light emitting diodes or other semiconductor devices optically connected to corresponding photo sensitive semiconductor diodes (or other devices) to provide electrical isolation. Additionally, it is seen that these electro-optical isolating units also employ Darlington transistor circuits as buffer devices, as shown in FIGS. 2 and 3. In particular, FIG. 2 shows optical isolator $M_1$ where one of two input pairs is used to control whether or not the breaker is turned on or off. The other one of the input pairs is unused. The output of optical isolator module $M_1$ is used to control the gate of small power FET device $Q_4$ which switches voltage $V_{cc}$ to the other components of the circuit from BIAS supply. $CR_7$ is preferably a precision Zener diode which provides the fixed voltage used by the current loop and the timer. $R_{13}$ provides current for the Zener diode and $C_6$ bypasses noise.

On the output side of the circuit, optoisolator module $M_2$ provides electrical isolation between the circuit and several status indication signal lines. In particular, it is seen that the presence of a DC voltage across the load is indicated by current flowing through resistor $R_9$ and diode $CR_8$. Likewise, the other output signal line pair from optoisolator module $M_2$ provides an over-current fault indicator. This signal is provided through transistor $Q_3$ which is connected to the output of timer 40.

The regulation mechanism of the present invention, that is the control of the impedance as seen by the load, is effectuated by voltage comparison occurring in amplifier $A_{v2}$ whose output is fed back through Darlington transistor $Q_8$ and then through the gate of $Q1$ where the voltage is controlled in an analog fashion.

In a preferred embodiment of the present invention, the circuit design illustrated in FIGS. 1 through 3 is constructed using components having values as shown in Table I below:

TABLE I

| Component Designation | Component Value/Model No. | Component Supplier |
|---|---|---|
| $R_s$ | 0.015Ω | Dale |
| $R_3$ | 100 KΩ | IRC |
| $R_4$ | 100 KΩ | IRC |
| $R_5$ | 750Ω | IRC |
| $R_6$ | 332 KΩ | IRC |
| $R_7$ | 20 KΩ | IRC |
| $R_8$ | 20 KΩ | IRC |
| $R_9$ | 17.4 KΩ | IRC |
| $R_{10}$ | 20 KΩ | IRC |
| $R_{11}$ | 10 KΩ | IRC |
| $R_{12}$ | 4.99 KΩ | IRC |
| $R_{13}$ | 20 KΩ | IRC |
| $R_{14}$ | 90.9 KΩ | IRC |
| $R_{15}$ | 100 KΩ | IRC |
| $R_{16}$ | 100 KΩ | IRC |
| $R_{17}$ | 100 KΩ | IRC |
| $R_{18}$ | 4.99 KΩ | IRC |
| $R_{19}$ | 4.3Ω | IRC |
| $R_{20}$ | 49.9 K | IRC |
| $R_{21}$ | 1 MΩ | IRC |
| $R_{22}$ | 2 KΩ | IRC |
| $R_{23}$ | 49.9 KΩ | IRC |
| $R_{24}$ | 49.9 KΩ | IRC |
| $R_{25}$ | 5.9 KΩ | IRC |
| $R_{26}$ | 1 MΩ | IRC |
| $R_{27}$ | 191 KΩ | IRC |
| $R_{28}$ | 2.90 KΩ | IRC |
| $C_1$ | 1000 pf | WIMA |
| $C_2$ | 1000 pf | WIMA |
| $C_3$ | 1000 pf | WIMA |
| $C_4$ | 0.22 μf | WIMA |
| $C_5$ | 0.1 μf | WIMA |
| $C_6$ | 0.1 μf | WIMA |
| $C_7$ | 0.01 μf | WIMA |
| $M_1$ | HCLP 2731 | Hewlett Packard Optoisolator |
| $M_2$ | HCLP 2731 | Hewlett Packard Optoisolator |
| $A_{v1}, A_{v2}, A_{i3}, A_{i2}$ | MC33174 P | Motorola Quad Op Amp |
| $A_{i1}, A_{i2}$ | LM 393 N | National Dual Comparator |
| $Q_1$ | IRFP054 | International Rectifier |
| $Q_2$ | VN2222 LL | Motorola |
| $Q_3$ | VN2222 LL | Motorola |
| $Q_4$ | IRFU9110 | International Rectifier |
| $Q_5$ | VN2222 LL | Motorola |
| $Q_7$ | IRFU110 | International Rectifier |
| $Q_8$ | MPSA63 | Motorola |
| $CR_1$ | 1N4531 | Rohm |
| $CR_2$ | 1N4531 | Rohm |
| $CR_3$ | 1N4531 | Rohm |

TABLE I-continued

| Component Designation | Component Value/Model No. | Component Supplier |
|---|---|---|
| $CR_4$ (Zener) | M255250 | Motorola |
| $CR_5$ | 1N4531 | Rohm |
| $CR_6$ (Zener) | 1N52488 | Motorola |
| $CR_7$ (Zener) | MZ5525 D | Motorola |
| $CR_8$ (Zener) | 1N4717 D | Motorola |
| $CR_9$ (Zener) | MZ5520 | Motorola |

From the above, it should therefore be appreciated that the circuit breaker of the present invention operates to electronically interrupt current to a circuit load when overcurrent conditions exceed a predetermined duration. It is also seen that the circuit of the present invention operates to provide a constant impedance as seen by the load during normal circuit operating conditions, including conditions of varying load. It should therefore be appreciated that the present invention achieves all of the objects stated above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An electronic circuit breaker comprising:

current control means for connecting a load in series with a source of electric current;

said current control means including a field effect transistor which is biasable so as to maintain said transistor in a normally conducting state in series with a resistor means;

multiloop control circuit means for controlling the flow of current through said transistor;

said multiloop control circuit means including a voltage control loop having an input derived from the voltage drop across said transistor;

said multiloop control circuit means including a current control loop having an input derived from the load current across said resistor means;

actuating means responsive to outputs from said voltage control loop and said current control loop for producing an output signal for actuating said transistor to operate in said normal conducting state;

timer means responsive to current level in said transistor for producing an output signal when said current level exceeds a predetermined value for a predetermined period of time; and said actuating means further being responsive to said output of said current control loop and said output of said timer means for interrupting the current in said transistor upon condition of excess current level;

whereby the voltage is regulated across said current control means as a function of current through said transistor so as to provide a substantially constant impedance, as seen by said load.

\* \* \* \* \*